Figure 1:
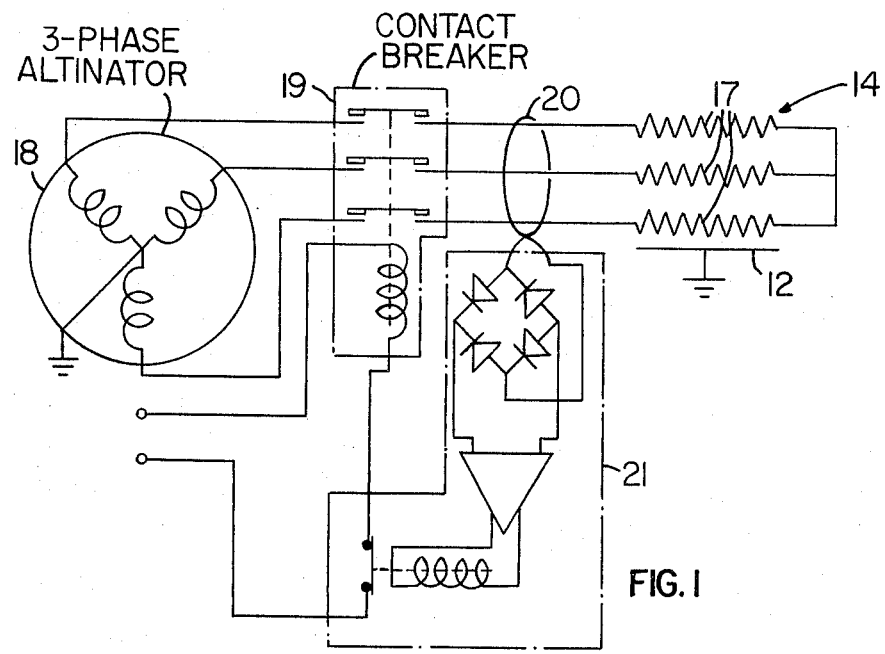

United States Patent [19]
Dean et al.

[11] 3,800,121
[45] Mar. 26, 1974

[54] ELECTRICAL HEATING APPARATUS FOR REDUCING OR PREVENTING THE FORMATION OF ICE ON AIRCRAFT PARTS

[76] Inventors: Michael Gordon Ellis Dean, 53 Cannon Ln.; Brian James Saunders, 42 Gayland Ave., both of Luton, Bedfordshire, England

[22] Filed: Mar. 22, 1972

[21] Appl. No.: 237,031

[30] Foreign Application Priority Data
Apr. 8, 1971 Great Britain.................. 9162/71

[52] U.S. Cl............... 219/202, 219/519, 219/522, 219/543, 219/544, 219/547, 244/134 D, 317/18 D
[51] Int. Cl...... H05b 1/02, B64d 15/12, H02h 1/02
[58] Field of Search .......... 219/202, 522, 543, 544, 219/547, 519, 514; 317/18 D; 244/134 R, 134 D, 134 A, 134 F

[56] References Cited
UNITED STATES PATENTS

| | | | |
|---|---|---|---|
| 3,218,436 | 11/1965 | Edwards et al..................... | 219/544 |
| 2,762,897 | 9/1956 | Vrooman et al................ | 219/543 X |
| 2,992,317 | 7/1961 | Hoffman....................... | 219/544 X |
| 3,364,335 | 1/1968 | Palatini et al.................. | 219/544 X |
| 3,512,045 | 5/1970 | Tipton et al..................... | 317/18 D |
| 3,663,865 | 5/1972 | Stanback....................... | 317/18 D |
| 3,614,534 | 10/1971 | Gross........................... | 317/18 D |
| 3,555,359 | 1/1971 | Morris et al.................... | 317/18 D |

*Primary Examiner*—A. Bartis
*Attorney, Agent, or Firm*—Holman & Stern

[57] ABSTRACT

An electrical heating apparatus for reducing or preventing the formation of ice on aircraft parts having a non-metallic external surface includes a metallic layer forming an electrical resistance heating element. The metallic layer is sandwiched beteen a pair of coextensive layers of electrical insulation and is secured in covering realtion to a conducting layer attached to the non-metallic external surface of the aircraft part to be protected. The conducting layer is isolated from the metallic heating element layer and is suitably grounded. A non-metallic protective covering layer is applied over the exposed surface of the insulation layer remote from the conductive layer. Electrical fault detecting means are provided for detecting insulation breakdown and possible arcing between the heating element layer and the electrically conducting layer. The fault detecting means includes means for disconnecting the heating element layer from its power source when a fault condition does occur.

4 Claims, 3 Drawing Figures

PATENTED MAR 26 1974 3,800,121

ELECTRICAL HEATING APPARATUS FOR REDUCING OR PREVENTING THE FORMATION OF ICE ON AIRCRAFT PARTS

This invention relates to electrical heating apparatus for reducing or preventing the formation of ice on aircraft parts and has as its object the provision of such apparatus in a convenient form.

In accordance with the present invention there is provided electrical heating apparatus for reducing or preventing the formation of ice on aircraft parts, said apparatus comprising in combination a metallic layer which forms an electrical resistance element, said metallic layer being sandwiched between a pair of insulating layers wherein, in use, the assembly of said metallic layer and said pair of insulating layers is mounted on an aircraft part, together with means for detecting an electrical fault condition which may occur, in use, in the electrical heating apparatus.

Preferably, where said electrical resistance element is, in use, supplied with an alternating current voltage said means for detecting an electrical fault condition comprises a coil through which in use the supply lines to the electrical resistance element pass.

Desirably, said coil is connected through a rectifier and, if required, an amplifier to a relay such that if, in use a signal is produced in said coil, said signal being caused by an electrical fault condition occurring in the electrical heating apparatus, then when this signal exceeds a predetermined value it trips the relay which is arranged to disconnect the electrical resistance element from its supply.

Conveniently, said apparatus is used on a non-metallic aircraft part and in this case a further metallic layer is applied to the aircraft part in addition to the application thereto of said apparatus.

It is to be understood that the term "supply lines" used herein is to be taken to include, in the case of a three phase supply, the three supply lines together with any return lead that may be provided, and, in the case of a single phase supply, both the go and return leads.

Alternatively, where said electrical resistance element is in use supplied with a direct current voltage, said means for detecting an electrical fault condition preferably comprises a voltage detector connected to a metallic aircraft part or further metallic layer (as the case may be) to which the fault can in use occur.

Figure 3:
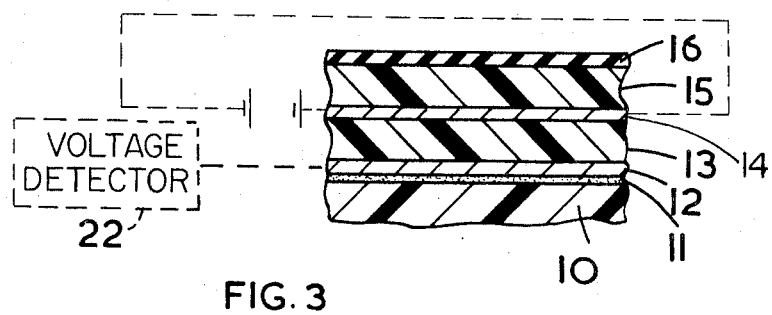

The invention will now be more particularly described with reference to the accompanying drawings wherein:

FIG. 1 is a schematic representation of one embodiment of electrical heating apparatus according to the present invention, FFIG. 2 is a sectional view through an aircraft part with said one embodiment of electrical heating apparatus mounted thereon, and FIG. 3 is a sectional view through an aircraft part with a further embodiment of electrical heating apparatus mounted thereon.

Figure 2:
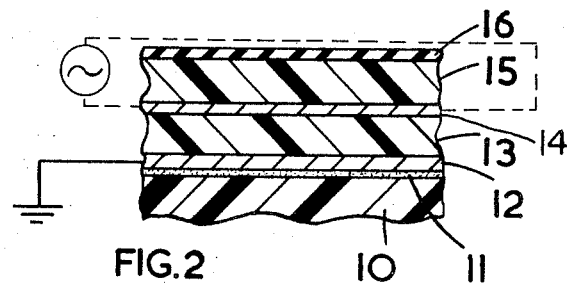

Referring to the FIGS. 1 and 2 of the drawings, the electrical heating apparatus shown therein is intended for reducing or preventing the formation of ice on the surface of an aircraft wing or control member or nose fairing or other aircraft part on which air impinges during flight. As shown more particularly in FIG. 2, a wing of an aircraft has a non-conductive polyester fibreglass skin 10. A layer of adhesive 11 is applied to the outer surface of this skin 10 and a metallic conducting earthed layer 12 in the form of a sheet or sheets of metal foil is then applied to this layer of adhesive 11. However, it is to be appreciated that the layer 12 may be applied in any other convenient manner, such as by spraying or painting. If the layer 12 is applied by spraying or painting then it will not be necessary to apply the layer of adhesive 11, but a sealant will normally be applied to the skin 10 prior to such spraying or painting. To the outer surface of the metallic layer 12 is applied an insulating layer 13 which may be in the form of an epoxy resin (approximately 0.03 inches thick) and a metallic layer 14 which forms an electrical resistance element is then applied to the outer surface of the insulating layer 13. A further layer of insulating material 15 which may also be formed of epoxy resin (approximately 0.02 inches thick) is then applied to the outer surface of the metallic layer 14 and finally a layer 16 of anti-static, errosion inhibiting semi-conducting paint is then applied to the outer surface of the insulating layer 15.

The metallic layer 14 which forms an electrical resistance element is relatively thin, that is to say in the order of 0.003 to 0.005 inches thick and this layer 14 may be applied by spraying or alternatively may be in the form of a layer of foil or woven wire. The layer 14 is conveniently made discontinuous in the sense that it is divided into a plurality of strips separated from one another and these strips may be connected electrically in series or parallel to form an electrical path therethrough. Several assemblies of these strips may be provided on different parts of the aircraft and these assemblies (indicated in FIG. 1 by the reference numeral 17) may be supplied with electrical power produced by an alternator 18. Conveniently, the alternator 18 has a three-phase star connected winding arranged to produce a three-phase output and the output from the alternator 18 is fed to the assembly 17 of electrical resistance elements via a contact breaker 19. The star point of the alternator is earthed. The assemblies 17 of electrical resistance elements preferably form a balanced load for the three-phase supply and in this case no return lead will be required from the star point of the three-phase load to the alternator 18.

Each assembly 17 may, if desired, be mounted on a different part of the aircraft and means for detecting an electrical fault condition which may occur, in use, in the electrical heating apparatus is further provided. The aforesaid means preferably comprises a coil 20 through which the supply lines to the assemblies 17 pass, this coil 20 forming the secondary winding of a current transformer whilst the supply lines form the primary winding. The secondary winding of the transformer (i.e. the coil 20) is connected via a rectifier and, if required, a current amplifier to a relay such that if a signal is produced in said transformer, said signal being caused by an electrical fault condition occurring in the electrical heating apparatus, then when this signal exceeds a predetermined value it trips the relay which is arranged to dis-connect the assemblies 17 from the supply by actuating the contact breaker 19. The rectifier and the relay are accommodated within a housing 21.

In operation, when the assemblies 17 are supplied with electrical power from the alternator 18 then the electrical resistance elements will be supplied with current and will therefore heat up the surface of the aircraft part thereby reducing or preventing the formation of ice on that aircraft part. As long as no fault condition occurs in the electrical heating apparatus then no signal will be induced in the coil 20 since this will be subjected to a zero external magnetic field. If, however, an electrical fault condition occurs, such as a breakdown of the insulating layer 13 thereby providing a conducting path between the electrical resistance element and the earthed metallic layer 12 then, a signal will be induced in the coil 20 caused by the unbalanced current and this signal will be rectified by the aforesaid rectifier and amplified if an amplifier is provided such that when the signal at the output of the rectifier exceeds a predetermined value the relay will trip and thereby actuate the contact breaker 19 to cut off the supply of electric current to the assemblies 17.

The aforesaid means for detecting an electrical fault condition reduce the fire hazard in an aircraft which may be caused by an electrical fault condition occurring in the electrical heating apparatus and this is especially necessary when the aircraft skin is formed of non-metallic skin 10, but if the skin 10 is formed of a metallic material then it will be unnecessary to provide the earthed metallic layer 12 in the above embodiment.

Moreover, the electrical resistance element need not be supplied from a three-phase source but may alternatively be supplied from a single phase source and in this case it is to be appreciated that both the go and return leads must pass through the coil 20.

When a three-phase supply is used then means for detecting an electrical fault condition may be provided in respect of each of the phases in addition to the coil 20 so that an indication of the area of failure can be ascertained. This has a particular use if the assemblies 17 are situated on different parts of the aircraft.

Referring to FIG. 3 of the drawings, the electrical heating apparatus shown therein is similar to that shown in FIG. 2 except that the electrical resistance element is supplied with a direct current voltage. In this case, means for detecting an electrical fault condition comprises a conventional voltage detector 22 which is connected to the metallic conducting layer 12 which is connected to earth through a high resistance to prevent the build-up of a static voltage. Thus, if a fault occurs between the layers 14 and 12 the voltage detector 22 will register this fault.

Finally, it is to be understood that the order of the layers shown in FIG. 2 may be varied and to give one example the layers 12 and 14 may be inter-changed.

We claim:

1. Electrical heating apparatus for reducing or preventing the formation of ice on aircraft parts having a non-metallic external surface comprising, in combination:

a first electrically conducting layer attached to the non-metallic external surface of an aircraft part, said first layer being grounded;

a second layer, of insulating material, applied to the surface of the first layer and coextensive therewith;

a metallic layer, forming an electrical resistance heating element, positioned on the second layer and coextensive therewith;

a third layer, of insulating material, positioned on the metallic layer and coextensive therewith;

an outer layer, of non-metallic material, applied to the third layer and coextensive therewith;

a source of potential connected to the metallic layer for supplying heating current thereto; and electrical fault-detecting means for detecting insulation breakdown and possible arcing between the heating element and the first electrically conducting layer.

2. Electrical heating apparatus as claimed in claim 1 where said electrical resistance element is, in use, supplied with an alternating current voltage from said potential source through supply lines, and said means for detecting an electrical fault condition comprises a coil through which, in use, the supply lines to the electrical resistance element pass.

3. Electrical heating apparatus as claimed in claim 2 wherein said coil is connected through a rectifier to a relay such that if, in use, a signal is produced in said coil, said signal being caused by an electrical fault condition occurring in the electrical heating apparatus, then when this signal exceeds a predetermined value it trips the relay which is arranged to disconnect the electrical resistance element from its source of potential.

4. Electrical heating apparatus as claimed in claim 3 wherein said coil is additionally connected through an amplifier to said relay.

* * * * *